April 19, 1927.  H. G. DORSEY  1,625,245
RECEIVING SYSTEM FOR COMPRESSIONAL WAVES
Original Filed June 22, 1918   7 Sheets-Sheet 2
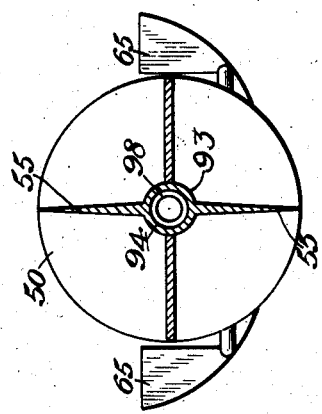
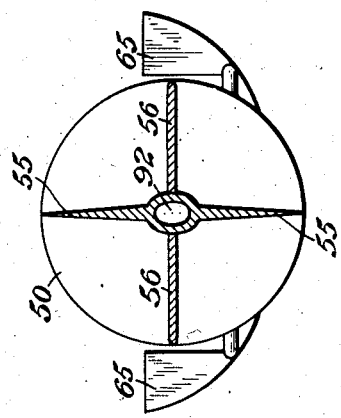
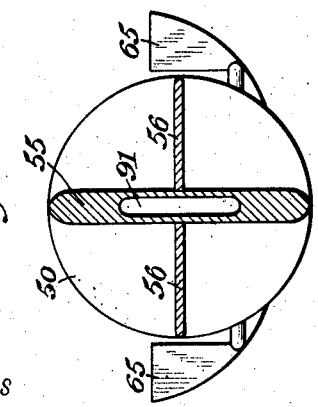
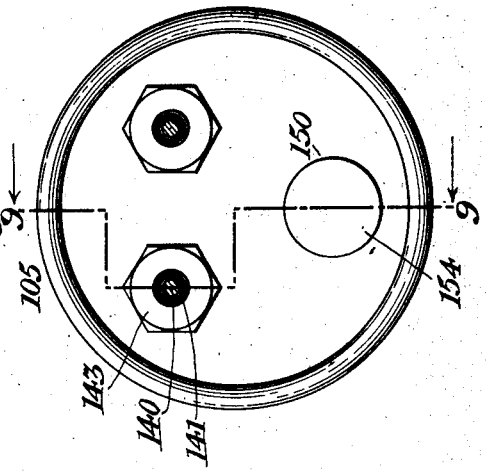
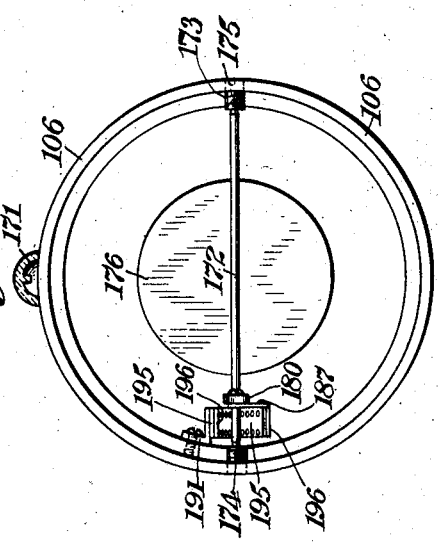
WITNESS
Chas. F. Clagett
INVENTOR
Herbert Grove Dorsey
BY
A. J. Gardner
HIS ATTORNEY April 19, 1927. 1,625,245
H. G. DORSEY
RECEIVING SYSTEM FOR COMPRESSIONAL WAVES
Original Filed June 22, 1918 7 Sheets-Sheet 3
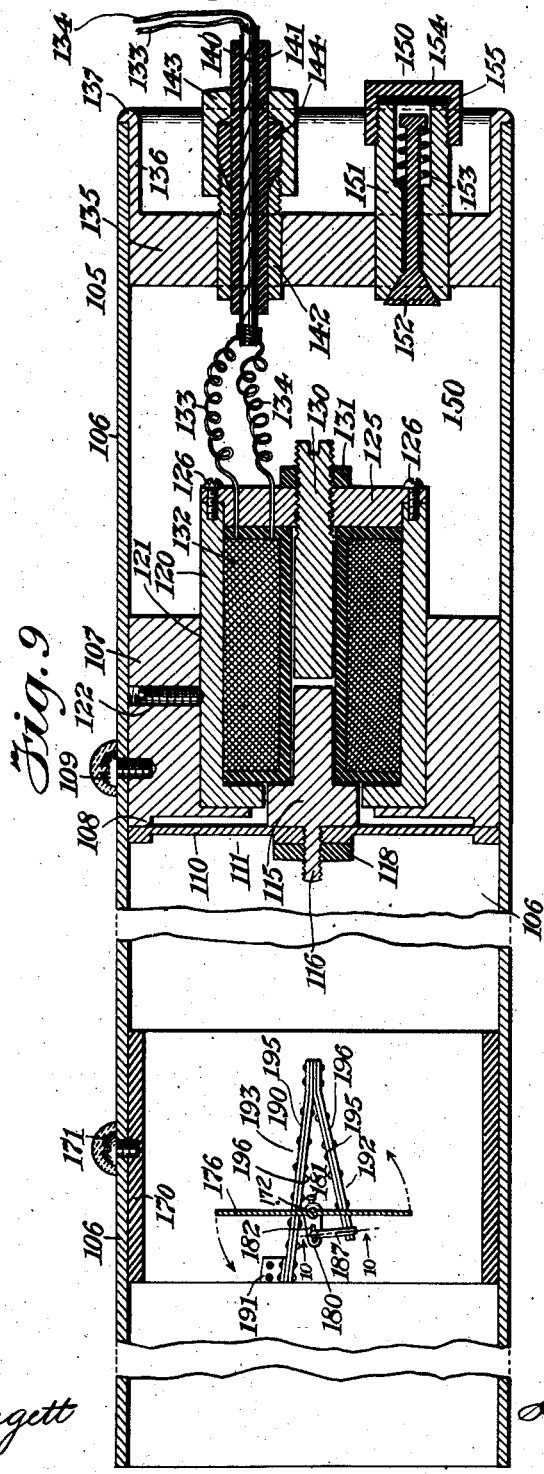
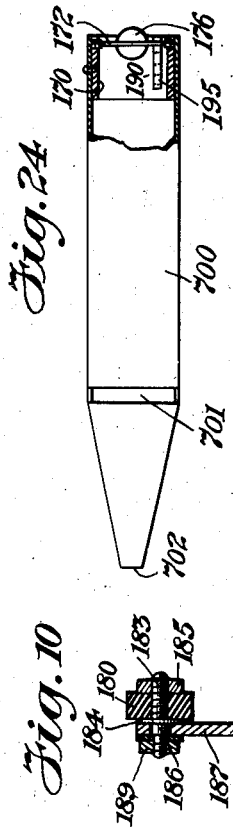
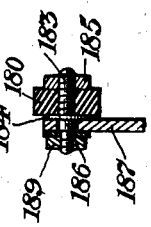
WITNESS
Chas. G. Clagett
INVENTOR
Herbert Grove Dorsey
BY
A. L. Gardner
HIS ATTORNEY

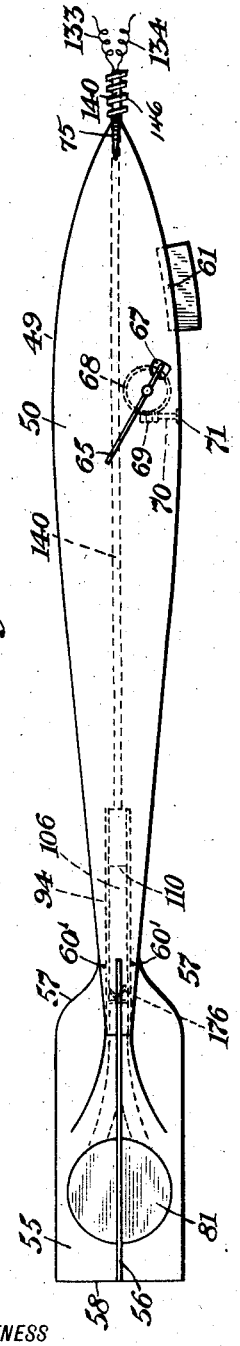

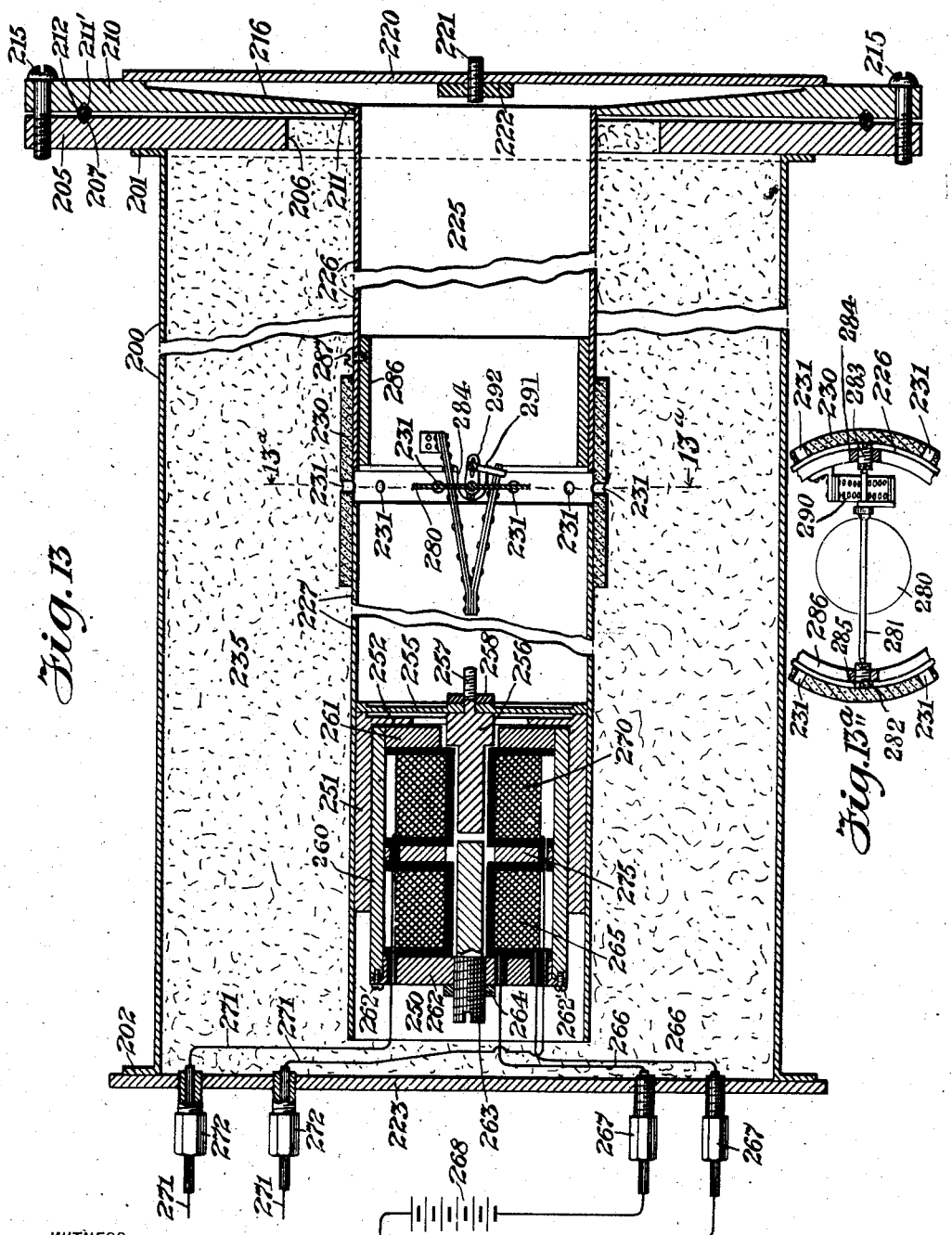

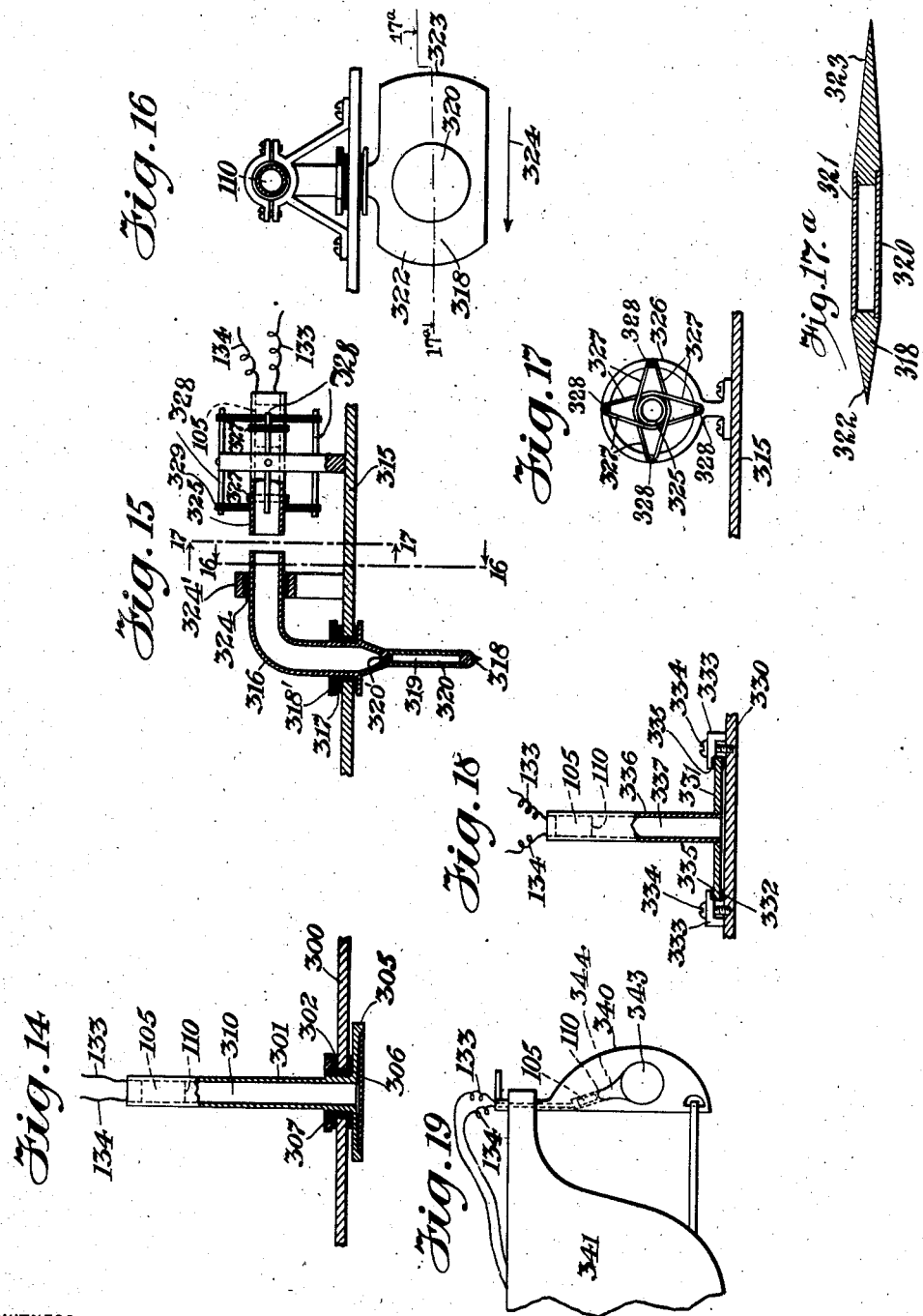

April 19, 1927.                                                    1,625,245
                         H. G. DORSEY
               RECEIVING SYSTEM FOR COMPRESSIONAL WAVES
                  Original Filed June 22, 1918    7 Sheets-Sheet 6
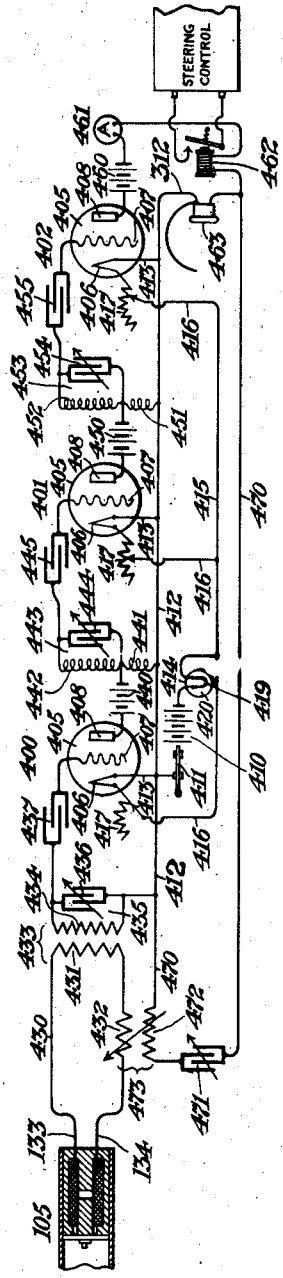
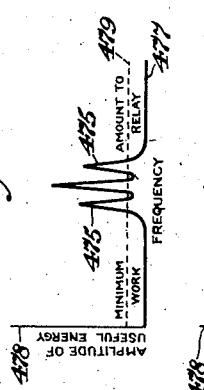
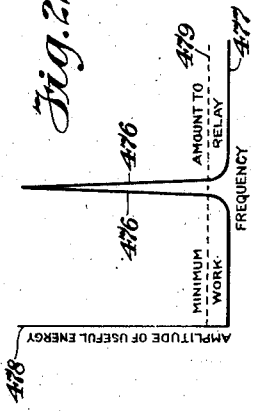
WITNESSES                                              INVENTOR
                                                Herbert Grove Dorsey
                                                    BY
                                                            HIS ATTORNEY April 19, 1927.

H. G. DORSEY 1,625,245

RECEIVING SYSTEM FOR COMPRESSIONAL WAVES

Original Filed June 22, 1918    7 Sheets-Sheet 7

Fig. 23

WITNESS
Chas. F. Clagett

INVENTOR
Herbert Grove Dorsey
BY
A. J. Gardner
HIS ATTORNEY

Patented Apr. 19, 1927.

1,625,245

UNITED STATES PATENT OFFICE.

HERBERT GROVE DORSEY, OF GLOUCESTER, MASSACHUSETTS, ASSIGNOR TO JOHN HAYS HAMMOND, JR., OF GLOUCESTER, MASSACHUSETTS.

RECEIVING SYSTEM FOR COMPRESSIONAL WAVES.

Application filed June 22, 1918, Serial No. 241,330. Renewed June 20, 1925.

Some of the objects of this invention are to provide a selective receiver for compressional waves which will be sensitive to waves of a given frequency but little affected by waves of any other frequency or by irregular compressional vibrations such as produce noises; to provide an improved receiver for compressional submarine waves; to provide in a receiver for compressional waves means for automatically compensating for variations in the wave length of the waves owing to temperature changes; to provide in a receiver for compressional waves means for amplifying the effect of the waves received; and to provide other improvements as will appear hereinafter.

In the accompanying drawings, Fig. 1 is a side elevation of a movable submarine sound receiver constructed in accordance with this invention; Fig. 2 a top view of the same; Fig. 3 is a rear elevation of the torpedo shown in Fig. 2; Figs. 4 to 8 are enlarged transverse sectional views of the same taken on the lines 4—4 to 8—8 respectively of Fig. 2; Fig. 9 is an enlarged fragmentary central longitudinal section of a portion of Fig. 1, the section of the righthand portion being on line 9—9 of Fig. 12; Fig. 10 is a section on the line 10—10 of Fig. 9; Fig. 11 is an elevation of the left end of Fig. 9 as viewed in the drawings; Fig. 12 is an elevation of the right end of Fig. 9 as viewed in the drawings; Fig. 13 is a fragmentary longitudinal central section of a modified form of sound receiver constructed in accordance with this invention; Fig. 13ᵃ a fragmentary transverse section on line 13ᵃ—13ᵃ of Fig. 13; Fig. 14 a side elevation partly in vertical central section of a further modified form of sound receiver constructed in accordance with this invention; Fig. 15 is a fragmentary side elevation partly in central vertical section of a further modified form of sound receiver constructed in accordance with this invention; Fig. 16 a section on the line 16—16 of Fig. 15 looking in the direction of the arrows; Fig. 17 a section on the line 17—17 of Fig. 15 looking in the direction of the arrows; Fig. 17ᵃ is a section on line 17ᵃ—17ᵃ of Fig. 16; Fig. 18 is a side elevation partly in vertical central section of a further modified form of sound receiver constructed in accordance with this invention; Fig. 19 a fragmentary side elevation of a marine vessel having a rudder provided with a submarine sound receiver constructed in accordance with this invention; Fig. 20 a diagrammatic representation of receiving circuits forming a portion of this invention; Figs. 21 and 22 are diagrams explanatory of the operation of the receiving system shown in Fig. 20 under different conditions of adjustment; Fig. 23 is a diagrammatic fragmentary top plan view of a marine vessel provided with apparatus constructed in accordance with this invention; and Fig. 24 a fragmentary side elevation partly in section of a modified form of valve employed in this invention.

In Figs. 1 to 12 is shown one form of receiver for compressional waves constructed in accordance with this invention and adapted to be towed through the water by any suitable marine vessel and to be maintained at a substantially predetermined depth in the water to receive submarine sound waves or other submarine compressional waves and to control apparatus upon the vessel by which the receiving device is being towed. This form of the invention includes a trailer 49 having a rigid body portion 50 which is preferably made of hard buoyant wood, or any other suitable material and which has a stream line contour approximately in the form of a fish. This body portion 50 is preferably substantially circular in cross-section throughout the major portion of its length and is tapered in opposite directions from a plane perpendicular to its longitudinal axis and located about one fourth of the length of the body portion from the front end of the body portion. The front end of the body portion is pointed to permit the trailer to be drawn easily through the water, and the rear end of the body portion is provided with a flat hollow metal blade or tail 55 rigid with the body portion and arranged substantially in a plane containing the longitudinal axis of the body portion 50. The forward portion of this tail is tapered forwardly in thickness and the tail terminates at its front end in sharp edges 57 to avoid resistance when the fish is being drawn through the water. The rear portion of the tail 55 is also tapered rearwardly in thickness and the tail terminates at its rear end in a sharp, vertical edge 58. The rear portion of the body portion 50 is also provided with a normally substantially horizontal substantially flat relatively thin metal blade or plate 56 which projects equally upon opposite sides of the normally vertical tail 55 and which is rigidly secured thereto and to the body portion 50 and lies substantially in a plane containing the longitudinal axis of the body portion 50. The rear portion of this blade 56 fits snugly in a slot 60 provided therefor in the rear portion of the tail 55. The opposite sides of the blade 56 are fitted to the contour of the tail 55 and are rigidly secured to the tail by any suitable means, as for instance by soft solder. The front inner portions of the tail 58 and of the blade 56 fit snugly in longitudinal slots provided therefor in the body portion of the fish 50 and are held fixedly therein by any suitable means, as for instance, by pins or screws 60', and the front ends of the blade 56 are sharpened to avoid resistance when the trailer is being towed through the water. In the forward lower portion of the trailer 49 is arranged a weight or keel 61 of lead or other suitable material which is so proportioned as to balance the trailer in such a manner that it will float in the water in a nearly horizontal position or with the front end of the trailer slightly elevated so as to keep the tail 55 of the trailer slightly below the surface of the water so that signals may be received when the trailer is stationary, as will appear hereinafter.

For maintaining the trailer 49 at a predetermined depth while it is being towed a given rate through the water, two diving planes 65 are arranged upon opposite sides of the trailer and in the same plane. These two diving planes 65 are rigidly secured to the opposite ends of a cylindrical shaft 66 which extends snugly but rotatably through the trailer. These two diving planes 65 are arranged in close proximity to the trailer and the outer edges of these planes are curved forwardly and inwardly, and the front ends of these planes are arranged to oscillate in slight segmental recesses 67 provided therefor in the side walls of the trailer so that the planes will not become entangled in seaweeds or other obstructions. Rigidly secured to the shaft 66 is a worm gear 68 which is engaged by a normally vertical worm 69 which is held against longitudinal movement but which is arranged to rotate about an axis fixed with respect to the fish. This worm 69 is provided with a downwardly projecting stem 70 rigid therewith and which terminates at its lower end in a head 71 provided with a slot arranged to receive a screw driver for rotating the worm 69, the head 71 being arranged in a recess provided therefor in the lower surface of the trailer so that the lower surface of the head is flush with the lower surface of the trailer.

By rotating the worm 69 manually in either direction the diving planes 65 may be adjusted to any desired inclination with respect to the trailer, and the worm 69 will hold the planes 65 against rotation under the action of the water while the trailer is being towed. The inclination at which the planes 65 should be adjusted will depend upon the depth at which it is desired to maintain the trailer and also upon the speed at which it is to be towed and the length and inclination of the towing cable. The head or forward end of the trailer 49 may be provided with two or more sharp edged fins 75 rigidly secured thereto for deflecting to one side or cutting any obstruction which may be met.

For receiving submarine compressional waves, the tail 55 of the trailer 49 is provided with a circular aperture 80 which is closed at its opposite ends respectively by two circular, parallel, coaxial diaphragms 81, which for clearness of description may be designated the primary diaphragms. These two diaphragms are of the same diameter and thickness and are preferably made of hard, non-corrosive metal, for instance of hard rolled sheet brass, or other suitable material, and should be of uniform thickness and free from kinks or bends to secure the best results. The marginal portions of these diaphragms are fitted snugly in two annular recesses 82 provided therefor in the opposite sides of the tail 55 and are secured in the recesses by any suitable means, as for instance by soft solder, the surfaces which are to be in contact being first tinned and then sweated together with just sufficient heat to make the solder run freely and yet not soften the brass or other metal of which the diaphragms 81 are made. The blade 56 is provided with two recesses 83 and 84 arranged upon opposite sides of the two diaphragms 81 respectively to permit the diaphragms to vibrate freely without striking the edges of the blade. The two diaphragms 81 are so proportioned and arranged as to have the same natural frequency of vibration when in operation.

In the form shown the primary diaphragms 81 are arranged in normally vertical planes spaced equally upon opposite sides of the longitudinal axis of the body portion 50 of the trailer 49 but the diaphragms might be arranged in normally horizontal planes spaced equally upon opposite sides of the longitudinal axis of the body portion 50, by changing the arrangement of the tail 55 and the blade 56 by rotating these two parts with respect to the body of the trailer about the longitudinal axis thereof and through 90° and then securing these two parts in fixed position with respect to the body 50 of the trailer.

Leading inwardly from the circular aperture 80 and spaced between the diaphragms 81 are two oppositely arranged openings 90 which lead into an elongated opening 91 which is oblong in transverse section and which extends inwardly through the tail 55. The upper and lower walls of this opening 91 converge inwardly and its side walls diverge slightly inwardly, and the walls of the oblong opening 91 merge into the walls of an opening 92 which is approximately elliptical in transverse section and which extends inwardly and gradually changes in transverse sectional contour until it assumes a substantially circular form 93 in transverse section at a point where the central portion of the tail 55 joins the body portion of the trailer. At this point the circular opening 93 communicates with a cylindrical opening 94 which extends longitudinally and axially through the rear portion of the body of the trailer.

For transforming the compressional submarine waves received by the primary diaphragms 81 into electrical oscillations, an electrical oscillator 105 is provided which includes a hollow, cylindrical casing 106 which fits snugly in the cylindrical opening 94 provided therefor in the body 50 of the trailer. Fitting snugly within the casing 106 is a cylindrical annular support or partition 107 made of brass or any other suitable material and provided upon its outer end with an annular marginal flange 108. This support 107 is held in a fixed position with respect to the casing 106 by means of a set screw 109, the head of which is covered with solder to keep the casing 106 watertight. Seated upon the flange 108 is a secondary diaphragm 110 made of hard sheet brass or other suitable material. The marginal portion of this diaphragm is secured to the flange 108 by any suitable means, as for instance by solder. The diaphragm 110 is thus arranged in a plane perpendicular to the longitudinal axis of the casing 106. The front face of the diaphragm 110 is provided with an annular recess 111 concentric therewith, and the diaphragm 110 is made of such a thickness and of such a free or vibrating diameter that the diaphragm when vibrating alone will have a natural frequency of vibration slightly higher than the natural frequency of vibration of the primary diaphragms 81 and such that when the secondary diaphragm is actuating its oscillator, as will appear hereinafter, the secondary diaphragm with the part or parts carried thereby will have the same natural frequency of vibration as the primary diaphragms 81 when these are in operation.

Extending inwardly from the secondary diaphragm 110 is a soft iron cylindrical plunger 115 which is arranged coaxially with the casing 106 and which is provided with a reduced threaded stem 116 which is threaded through the central portion of the diaphragm 110 and clamps the plunger 115 against the inner surface of the diaphragm and in a fixed position with respect to the diaphragm. A nut 118 is threaded around the stem 116 and clamped against the outer side of the diaphragm 110 and assists in holding the plunger 115 clamped in position against the diaphragm 110. By changing the thickness of this nut the natural frequency of vibration of the secondary diaphragm with its attached parts while in operation may be varied.

For producing a permanent magnetic field around the plunger 115, a permanently hollow cylindrical hard steel permanently magnetized shell 120 surrounds and is coaxial with the plunger 115 and fits snugly in a cylindrical recess provided therefor in the support 107, and is held in position therein by a set screw 122 which is threaded inwardly through the support. The inner end of the shell is closed by a soft iron cap 125 which is rigidly secured to the shell by means of screws 126. Arranged within the shell 120 and in longitudinal alinement with the plunger 115 is a cylindrical soft iron core 130, the inner end of which is spaced slightly from the inner end of the plunger and the outer end of which is threaded through the central portion of the cap 125 and is held in a fixed position with respect to the cap 125 by means of a lock nut 131. Fitting snugly within the shell 120 and spaced from and insulated from the plunger 115 and the core 130 is a coil 132 of insulated wire, the opposite ends 133 and 134 of which extend through and are insulated from the cap 125.

The inner end of the casing 106 is hermetically sealed by means of a cylindrical closure 135 made of brass or other suitable material which fits snugly within the casing and which is provided with an outwardly extending cylindrical flange 136 integral therewith. The outer edge of this flange 136 is flush with the inner edge of the casing 106 and the two edges are joined by an annular coating 137 of solder, thus hermetically sealing the casing 106. If it should be necessary to reopen the casing 106 this could be quickly accomplished by filing away the annular coating 137 of solder and then withdrawing the closure 135.

The opposite insulated ends 133 and 134 of the coil 132 are brought together in the form of a cable 140 which extends tightly through a section of heavy soft rubber tubular insulation 141 which fits snugly in a hollow cylindrical bushing 142 of brass or other suitable material which fits tightly in a cylindrical opening provided therefor in the closure 135, the bushing 142 being soldered or otherwise secured in position in such a manner as to form an air-tight joint.

A centrally perforated cap 143 fits snugly around the cable 140 and is threaded over the front or outer end of the bushing 142, and a packing ring 144 of soft brass or other suitable material surrounds the cable 140 and is arranged within the cap 143. The packing ring 144 is provided with a conical inner end which fits snugly in a conical recess provided therefor in the outer end of the bushing 142 and is clamped securely against the bushing 142 and around the cable 140 by the cap 143 in such a manner as to provide a mechanically strong and water-tight joint. The inner end of the cable 140 and all soldered joints are covered with a coating of shellac varnish, as a further precaution against leakage of air, water, or electric current, and to avoid corrosion. The cable 140 is extended through and secured against longitudinal movement in an axial cylindrical opening 145 extending longitudinally through the body 50 of the trailer, and the cable 140 is extended forwardly from the trailer through any desired distance to serve as a tow line and also to conduct the electrical oscillations produced in the coil 132, as will appear hereinafter. At the point where the cable 140 merges from the body 50, a heavy spiral spring 146 is wound snugly around the cable and its inner end is rigidly secured in a recess provided therefor in the front end of the body 50, as shown in Fig. 2, so that in towing or handling the trailer the spiral spring will prevent any sharp bends in the portion of the cable surrounded by the spring and thus avoid injury to the insulation of the cable.

For testing for leaks and for controlling the pneumatic pressure within the air space 150 between the partition or support 107 and the closure 135, a check valve is provided. This valve comprises a hollow cylindrical brass bushing 151 which extends tightly through a cylindrical opening provided therefor in the closure 135 and soldered in position to make a tight joint. Extending through this bushing 151 is an inwardly opening valve element 152 which is normally held closed by a compressed spiral spring 153. A cap 154 is threaded over the outer end of the bushing 151 and normally acts to clamp a rubber washer 155 over the outer end of the bushing to prevent either air or water from entering the space 150 through the bushing 151. By removing the cap 154 and washer 155 and attaching the delivery pipe of an air pump to the outer end of the bushing 151 any desired pressure of air may be applied in the space 149. Under some conditions it may be found desirable to have the pressure in the space 149 slightly above atmospheric pressure, or even sufficient to balance the water pressure at the depth to which the device may be submerged when in operation. It has been found that when the receiver is sealed up at a temperature above the working temperature it is desirable to have the air in the space 149 slightly above the atmospheric pressure at the time of sealing.

The secondary diaphragm 110 is spaced at such a distance from the two primary diaphragms 81—81 that the column of air 150 enclosed within the trailer between the secondary diaphragm 110 and the two primary diaphragms 81 will have a natural frequency of vibration equal to the natural frequency of vibration of the diaphragms when the trailer is in operation. The enclosed air column 150 therefore forms a resonator which is tuned to respond to and to amplify the vibrations of the primary diaphragms when these are vibrated in their natural frequency. Since the velocity of compressional or sound waves in air depends upon the temperature of the air, and is appreciably varied by and in proportion to slight variations in the temperature of the air, and as the wave length of compressional or sound waves in air depends directly upon the velocity of the waves, it is evident that changes in the temperature of the water surrounding the trailer 49 would cause changes in the tuning of the column of air 150 unless the walls, including the diaphragms 81, 81 and 110, surrounding the air column 150 were expanded or contracted by such changes in temperature sufficiently to vary the proportions of the air column 150 sufficiently to compensate for such changes.

It has been found that in the construction shown in Figs. 1 to 12 and just described the expansion or contraction of the walls surrounding the air column 150, due to changes in the temperature of the surrounding water, is not sufficient to compensate for such changes to such an extent as to maintain a constant tuning of the air column 150, under such variations in the temperature of the surrounding water as occur in practice in different localities and at different seasons of the year, and consequently this invention provides means for automatically keeping the air column 150 tuned to a constant frequency.

In Figs. 9 and 10 is shown a device constructed and arranged in accordance with this invention for automatically keeping the air column 150 tuned to a constant frequency under variations in the temperature of the air column. This device comprises a cylindrical support 170 which fits snugly but slidably in the casing 106 and which is held in a suitable fixed position between the primary diaphragms 81 and the secondary diaphragm 110 by means of a headed screw 171 extending loosely through the casing 106 and threaded into the support 170. The head of the screw 171 is covered with solder to avoid leakage of air or water through the opening through which the screw is threaded. Arranged within the support 170 and extending diametrically thereof is a shaft 172 the ends of which are conical and mounted for oscillation in two conical recesses provided therefor in two bearings 173 and 174, one of which, 173, fits tightly in an internal recess provided therefor in the support 170 and the other of which, 174, is threaded tightly through the support 170 and is provided upon its outer end with a diametrical slot 175 arranged to receive a screw driver for adjusting the position of the bearing. Rigidly secured to the shaft 172 is a flat circular disk 176 of sheet metal forming a butterfly valve which is preferably so arranged that its center is in the longitudinal axis of the casing 106.

For automatically swinging or oscillating the disk or valve 176 in response to variations in the temperature of the air column 150 a crank arm 180 is mounted upon and is rotatively adjustable with respect to the shaft 172, being normally held fixed with respect to the shaft by means of a set screw 181. This crank arm 180 is provided with an elongated slot 182 extending radially with respect to the shaft 172 and in this slot is arranged a bolt 183 provided with a collar 184 and a nut 185 whereby the bolt is adjustably clamped in position. One end of the bolt is extended to form a pivot or crank pin 186 and snugly but rotatively surrounding the crank pin is one end of a pitman 187 which is held against movement longitudinally of the crank pin 186 in one direction by means of a washer 188 and a nut 189. The other end of the pitman 187 is pivotally connected to one end of a bimetallic expansion member 190 the other end of which is rigidly connected to a rigid bracket 191 which is rigidly secured to the support 170. The expansion member 190 includes two arms 192 and 193, one end of which is securely riveted to a corresponding end of the other. Each of these arms is formed of two leaves or layers of different metals or other material having different coefficients of linear expansion due to heat. For instance each arm may be made of a layer 195 of iron and a layer 196 of brass, clamped together by rivets 197, the more expansive material being arranged upon the same side of each arm so that any decrease in the temperature of the air column 150 will cause the valve 176 to be rotated in a clockwise direction as viewed in Fig. 10.

It is well known among experts in acoustics that if the mouth of an open resonator be contracted the pitch of the resonator will be lowered, or in other words the resonator will be rendered responsive to a longer wave length, and conversely that if the mouth of the resonator be enlarged the pitch of the resonator will be raised, or in other words the resonator will be rendered responsive to a shorter wave length. The length of an ordinary open resonator is approximately equal to one quarter of the wave length of the sound waves to which the resonator will respond, and the length of an ordinary resonator which is closed at both ends is equal approximately to one-half the wave length of the sound waves to which the resonator will respond.

The actual length of the resonator shown in Figs. 1 to 12, which is closed at both ends and which encloses the air column 150, is the distance between the secondary diaphragm 110 and the extreme outer portion of the cylindrical wall which bounds the aperture 80 which is closed by the primary diaphragms 81. Because of the irregularity in shape of the enclosed volume of air this distance will not be the same as the half wave length of the sound to which it responds, nor will the crest of the stationary half wave be midway between the two extremities. The crest will be approximately a quarter wave length from the secondary diaphragm 110, since this portion of the resonator is cylindrical, and its exact position may be readily found by any of the well known methods given in text books on sound.

In the operation of the automatic temperature compensating device shown in Figs. 9 and 10 the parts are so adjusted, initially, that when the air column 150 is at the highest temperature under which the trailer will ever be used, the valve 176 will be in a plane perpendicular to the longitudinal axis of the casing 106 and approximately coinciding with the plane containing the crests of the half waves set up in the resonator when the resonator is in operation. This will be the proper adjustment of the valve for the longest wave length of the resonator. Then for any lower temperature the expansive member 190 will act to automatically rotate the valve in a counter clockwise direction as viewed in Fig. 9 to diminish the effective area of the valve accordingly and to correspondingly increase the effective area of the opening at the crests of the half waves between the opposite ends of the resonator which is equivalent to shortening the effective length of the resonator, and which renders the resonator responsive to the half waves set up in the air column 150 which have been correspondingly shortened by the decrease in temperature.

When the trailer 49 shown in Figs. 1 to 12 is in operation receiving submarine compressional or sound waves having a frequency approximately equal to the frequency to which the primary diaphragms 81, the air column 150 and the secondary diaphragm 110 are tuned, the primary diaphragms 81 are vibrated by and in unison with the received waves and set up corresponding vibrations or half waves in the air column 150 of the resonator. These vibrations of the air column 150 act to amplify the vibrations of the primary diaphragms 81 and to set up corresponding vibrations in the secondary diaphragm 110 and the soft iron plunger 115 carried thereby. The vibrations of the plunger 115 act inductively in a well known manner upon the fixed soft iron core 130 and upon the coil 132 to cause corresponding electrical oscillations to be set up in the coil 132 and consequently in the circuit 133—134 controlled by the coil.

In this operation the air column 150 forms a perfectly elastic connection between the primary diaphragms 81 and the secondary diaphragm 110 so that any changes in the normal positions of the primary diaphragms due to changes in normal water pressure do not change the normal position or normal curvature of the secondary diaphragm to any appreciable extent as such changes in the normal positions of the primary diaphragms would necessarily be comparatively slight and would not appreciably change the normal pressure of the air column 150.

By thus connecting the primary diaphragms 81 to the secondary diaphragm 110 through an air column 150 it is possible to make the primary diaphragms 81 of relatively large diameter so as to have large receiving surfaces, and to make the secondary diaphragm 110 of relatively small diameter and consequently extremely sensitive to the compressional waves produced in the air column 150 by the primary diaphragms. By this arrangement vibrations of the two primary diaphragms 81 of slight amplitude produce corresponding vibrations of a greater amplitude in the secondary diaphragm 110. Moreover by making the secondary diaphragm 110 and the electrical oscillator actuated thereby comparatively small, these parts may be made with great accuracy and of extremely light weight thus increasing the sensitiveness, efficiency and effectiveness of these parts.

In Fig. 13 is shown a modified form of receiver constructed in accordance with this invention for receiving compressional waves. This receiver comprises a rigid cylindrical casing 200 which is provided with terminal annular outwardly projecting flat flanges 201 and 202. Rigidly secured to the outer end of the casing 200 and coaxial therewith is a flat circular rigid plate 205 which is provided with a central circular opening 206 and which is also provided upon its outer flat surface with an annular groove 207 concentric therewith and V-shape in cross section. Spaced slightly in front of the plate 205 and arranged coaxially therewith and substantially parallel thereto is a flat rigid circular plate 210 which is provided with a central circular aperture 211 and which is also provided upon its inner surface with an annular groove 211' V-shape in cross section and arranged opposite the annular groove 207 of the inner plate 205. Seated in the two grooves 207 and 211' is an annular gasket 212 of rubber which normally holds the plates 205 and 210 slightly spaced apart. The outer plate 210 is secured in a substantially fixed position with respect to the inner plate 205 by means of screws 215 which clamp the outer plate securely against the gasket 212, and the gasket thus clamped acts to prevent any leakage of air or water between the plates.

The front surface of the outer plate 210 is provided with a conical recess 216 coaxial therewith, and covering this recess and coaxial therewith is a vibratory primary diaphragm 220 made of hard rolled brass or of any other hard non-corrosive metal or of any other suitable material. The marginal portion of this diaphragm is rigidly secured to the outer plate 210 by any suitable means as for instance by solder. The plate 210 may be recessed to receive the marginal portion of the diaphragm 220 in the same manner that the tail 85 is recessed to receive the diaphragm 81 in the construction shown in Fig. 4. A short screw 221 may be threaded through the central portion of the diaphragm to receive a nut 222 of a suitable weight to cause the diaphragm thus loaded to have the desired natural frequency of vibration. By changing the nut 222 for one thicker or thinner the principal natural frequency of vibration of the diaphragm may be varied accordingly and the diaphragm may thus be tuned to respond to any desired frequency of compressional waves when the diaphragm is immersed in water at a given depth. The inner end of the casing 200 is sealed by a flat rigid circular metal plate 223 rigidly secured thereto by any suitable means, for instance by solder.

For receiving and amplifying the compressional waves produced by the action of the inner surface of the primary diaphragm 220 when the diaphragm is vibrated by the action of compressional waves upon the outer surface of the diaphragm, a resonator 225 is provided which includes two longitudinally alined spaced cylindrical tubes 226 and 227 of the same diameter which are arranged within the casing 200 and coaxially therewith. These tubes are made of brass or any other suitable metal or material, and yieldingly connected together by a sleeve 230 of felt or other sound absorbing material which fits tightly around the two adjacent ends of the two tubes 226 and 227 and which serves to hold the two tubes in alinement and to prevent any extraneous noises from being transmitted through the metal of the outer tube 226 to the inner tube 227.

The tubes 226 and 227 are spaced apart preferably along a region that lies at the crest of the half waves that are set up in the resonator when in operation, as will appear hereinafter, and consequently the felt sleeve may be provided with a series of apertures 231 arranged between the tubes to prevent a node from being formed in this region and consequently to prevent the resonator from responding to the first overtone of its fundamental note. The outer end of the outer tube 226 fits tightly in and is rigidly secured in the aperture 211 provided therefor in the outer front plate 210, and the inner end of the inner tube 227 is spaced from the back plate 223.

Both tubes 226 and 227 are further secured in position by means of a loose cotton or other suitable packing 235 which fills the annular space between the tubes and the outer casing 200 and the space between the inner end of the inner tube 227 and the back plate 223. The cotton packing 235 serves not only as an additional support for the tubes 226 and 227, but also prevents the enclosed space around the tubes from acting as a resonator, and serves to insulate both tubes from an extraneous noise or sounds that might otherwise be transmitted to the tubes through the enclosed space surrounding the tubes.

From the foregoing it is evident that in this construction the inner tube 227 of the resonator is entirely supported through the joint action of the felt sleeve 230 and the loose cotton packing 235 and consequently is entirely insulated from all extraneous vibrations except such as are transmitted through the primary diaphragm 220 and the space surrounded by the outer tube 226.

For receiving the compressional waves set up in the resonator 225, and for transforming the waves into electrical oscillations, a sound actuated electrical oscillator 250 is provided which may be of any suitable construction but which in the form shown in Fig. 13 includes a hollow cylindrical metal bushing 251 which fits tightly but adjustably in the rear portion of the inner tube 227 and which is provided with an internal annular flange 252 integral therewith spaced slightly back from the front end of the bushing. The front end of the bushing 251 is covered by a circular secondary diaphragm 255 of brass or any other suitable material which is marginally secured to the bushing by any suitable means, for instance by solder. The secondary diaphragm 255 is spaced at such a distance from the primary diaphragm 220 that the column of air enclosed in the resonator 225 between the two diaphragms will have a natural frequency of vibration equal to the natural frequency of vibration of the primary diaphragm 220 when the device is in operation. This distance will be slightly less than one half the wave length of the compressional waves to which the resonator will respond when thus tuned.

Arranged upon the rear side of the diaphragm and coaxially with the inner tube 227 is a cylindrical soft iron plunger 256 which has a reduced front end 257 which fits tightly through an opening provided therefor in the central portion of the diaphragm and the plunger is clamped securely to the diaphragm by means of a nut 258 threaded over the reduced end of the plunger. This nut 258 may be varied in thickness or additional nuts may be threaded over the front end of the plunger to cause the diaphragm when thus loaded to have the same natural frequency of vibration as the primary diaphragm 220 and the column of air confined in the resonator 225. An annular marginal portion and a circular central portion of the diaphragm 255 are slightly thicker than the remaining annular portion of the diaphragm to protect the connection between the diaphragm and the bushing and to provide a firm seat for the plunger 256, and thus minimize any tendency of the plunger to vibrate in any direction other than along the longitudinal axis of the inner tube 227. A soft iron shell 260 fits tightly in the bushing 251 and in the front end of this shell is fixedly secured a soft iron ring 261 the inner wall of which is spaced from the plunger 256. The annular air gap between the plunger 256 and the inner wall of the ring 261 is made very small and the ring 261 is made comparatively thick so that the magnetic reluctance of the air gap will be as small as possible.

The outer end of the shell 260 is closed by a circular cap 262 of soft iron held in place by screws 267. Threaded centrally through the cap 262 is a longitudinally adjustable core 263 of soft iron which is locked in any desired position of adjustment by means of a nut 264. The inner end of this core is spaced at all times from the inner end of the plunger 256.

Surrounding the core 262' and fixed in the shell 260 is a magnetizing coil 265 which is separated from the core by a tubular section of insulation, the inner surface of which is spaced from the core. This magnetizing coil forms part of a circuit 266 which extends through and is insulated from the cap 262 and extends through and is insulated from stuffing boxes 267 which extend through the back plate 223, and which are constructed as hereinbefore described and as shown in Figs. 11 and 12. This circuit is arranged to be energized by a battery 268 or other source of direct current.

Surrounding the plunger 256 and fixed within the shell 260 is a generating coil 270 which is separated from the plunger by a tubular section of insulation the inner surface of which is spaced from the plunger to allow free vibration of the plunger longitudinally. This coil forms part of a circuit 271 which extends through and is insulated from the cap 262, and which extends through and is insulated from stuffing boxes 272, constructed as hereinbefore described and extending through the back plate 223.

Fitting tightly within the shell 260 and arranged between and insulated from the two coils 265 and 270 is a ring 275 of soft iron which surrounds the inner end of the core 263. The two conductors 271, 271, leading from the opposite ends of the generating coil 270 extend through and are insulated from this ring 275. The inner diameter of this ring 275 is so proportioned as to leave normally a slightly wider annular air gap between the core 263 and the inner wall of the ring than is left between the plunger 256 and inner wall of the corresponding ring 261. These two annular gaps are so proportioned that when the secondary diaphragm 255 is being vibrated by the received waves and moves inwardly, thus decreasing the gap between the inner end of the plunger 256 and the inner end of the core 263, the magnetic flux will flow from the core 263 mainly through the plunger 256 and will return through the ring 261 surrounding the plunger, and so that when the diaphragm moves outwardly thus increasing the air gap between the core and the plunger the magnetic reluctance will be much less from the core 263 to the ring 275 than from the core 263 through the plunger 256, and consequently there will be a greater change in flux through the generating coil 270 than there would be if the flux were allowed to leak back to the shell 260 without passing through the ring 275 surrounding the core. It is therefore evident that in this construction the intermediate ring 275 acts as an intermittent or periodic magnetic shunt to increase the efficiency of the oscillator.

The modified form of receiver shown in Fig. 13 may also be provided with any suitable means for automatically keeping the air column enclosed by the resonator 225 tuned to a constant frequency under variations in the temperature of the air column. For instance, the receiver may be provided with a device for this purpose including a flat circular valve 280 carried by a rotary shaft 281 terminally supported in two bearings 282, 283 threaded through two lugs 284, 285 integral with a cylindrical sleeve or support 286 fitting snugly in the inner tube 226 and held in a suitable fixed position by a screw 287. In this construction the valve 280 is controlled by a bimetallic expansion member 290 acting through an adjustable pitman 291 and an adjustable crank arm 292, these parts being substantially the same in construction and operation as the valve 176, expansion member 190, pitman 187 and crank arm 180 shown in Figs. 9 and 10, and hereinbefore described.

In Fig. 14 is shown a modified form of this invention arranged to project into the surrounding water through an exterior wall 300 of a marine vessel. This form includes a metal tube 301 which extends snugly through a soft rubber washer 302 which fits snugly in a circular opening provided therefor in the wall 300. Rigidly secured to the outer end of the tube 301 is a hollow circular metal casing 305 in which is marginally secured a circular, flat primary diaphragm 306 made of hard rolled brass or any other suitable material. The tube 301 is clamped yieldingly in position by means of a nut 307 which is threaded over the tube 301 and which bears against the inner surface of the washer 302. The washer 302 acts to form a watertight joint and also acts to protect or insulate the tube 301 from extraneous vibrations other than those transmitted through the diaphragm 306. Within the inner end of the tube 301 is secured an electrical oscillator 105 constructed and arranged as hereinbefore described and shown in Fig. 9, including a secondary diaphragm 110 which is tuned to the same natural frequency of vibration as the primary diaphragm and which is spaced from the primary diaphragm at such a distance that the column of air 310 enclosed between these diaphragms will be tuned to oscillate in the same frequency as the diaphragm. The primary diaphragm 306 may be arranged with its outer surface in contact with the water and either in a horizontal or in a vertical plane, or in any other convenient position. It is thought that the operation of this form of the invention will be understood from the foregoing description.

In Fig. 15 is shown a further modified form of this invention arranged to project into the surrounding water through an exterior wall 315 of a marine vessel. This form includes a main metal tube 316 which is substantially circular in cross-section throughout its length and which consists of two substantially straight portions and a longitudinally curved intermediate portion, the longitudinal axes of the straight portions being arranged to form a right angle. The outer portion of this tube 316 extends snugly through a soft rubber washer 317 which fits snugly in a circular opening provided therefor in the wall 315. The outer portion of the tube 316 is clamped yieldingly in position by means of a nut 318' threaded over the tube and engaging the inner face of the washer 317. The washer 317 serves to prevent leakage of water through the opening in which it is located and also serves to protect the tube 316 from vibrations of the wall 315. Rigidly secured to the outer end of the tube is a flat oblong metal plate 318 which is arranged in a plane containing the longitudinal axis of the outer portion of the tube 316 and substantially perpendicular to the longitudinal axis of the inner end of the tube 316, and which is provided with a circular opening 319 over which are marginally secured two parallel circular primary diaphragms 320, 321, made of the same material and of the same dimensions. The outer surfaces of these diaphragms 320, 321 are flush with the outer surfaces of the plate 318 and the plate 318 is made comparatively thin and is tapered in thickness forwardly and rearwardly from the diaphragms along a line parallel to the wall 315 to form a sharp longitudinally curved front edge 322, and a sharp longitudinally curved rear edge 323, both edges being substantially in a plane substantially perpendicular to the plane of the wall 315, and the rear edge being spaced at a greater distance from the diaphragms than the front edge 322 to minimize any tendency of the plate to rotate with respect to the boat when the boat is moving forwardly as indicated by the arrow 324. The space between the diaphragms 320 and 321 communicates with the interior of the tube through a small aperture 320'. The inner end of the tube 316 is yieldingly supported by a soft rubber washer 321 which snugly surrounds the tube and which fits snugly in a rigid cylindrical support 322 which is fixedly secured to the wall 315. The washer 321 protects the tube from vibrations of the wall 315 of the boat. In longitudinal alinement with the inner end of the tube 316 and spaced slightly therefrom is an inner cylindrical secondary metal tube 325 which extends through and is coaxial with a rigid annular support 326 which is fixedly secured to the wall 315. The secondary tube 325 is yieldingly held substantially in a given position with respect to the annular support 326 by means of a plurality of continuous, normally slightly extended rubber bands 327 which are looped around the tube 325 and around the ends of four relatively rigid bars 328 which are substantially parallel to the longitudinal axis of the tube 325 and which are rigidly secured to the annular support 326. The rubber bands 327 protect the tube 325 from vibrations of the wall 315 of the boat. Secured in a suitable position in the inner end of the secondary tube 325 is an electrical oscillator 105 constructed as hereinbefore described and including a diaphragm 110, and arranged to set up electrical oscillations in a circuit 133—134 which may be arranged to control any desired receiving device or system, as will appear hereinafter. The main and secondary tubes 316 and 325 are so arranged and proportioned that they form jointly a resonator which is tuned to the natural frequency of vibration of the diaphragms 320, 321, when the diaphragms are submerged and in operation. The tubes 316, 325 are spaced apart along a region which lies at the node of the half wave length which, when the device is in operation, is set up in the column of air enclosed by the tubes. In this construction the distance measured along the longitudinal axes of the tubes from the outer end of the main tube 316 to the inner end of the secondary tube would be approximately equal to the length of the half waves which, when the device is in operation, are set up in the air column enclosed by the tubes.

In Fig. 18 is shown a modified form of this invention whereby compressional submarine waves may be received through the exterior shell or hull 330 of a marine vessel. This form comprises a circular plate 331 of metal or other suitable material which rests marginally upon a soft rubber annular gasket 332 coaxial therewith and which is interposed between the plate 331 and the exterior wall 330 of the vessel. The plate 331 is clamped against the gasket 332 by means of two or more clamps 333 held in position by screws 334 extending loosely through the clamps and threaded into the exterior wall 330, a soft rubber pad 335 being interposed between each clamp and the plate. The plate 331 is provided with a central aperture in which is rigidly secured one end of a tube 336 of metal or other suitable material which is coaxial with the plate 331 and which projects inwardly therefrom. In the inner end of this tube 336 is secured an electrical oscillator 105 which is constructed as hereinbefore described and which is arranged to set up electrical oscillations in a circuit 133, 134. The oscillator 105 includes a diaphragm 110 which is spaced at such a distance from the wall 130 that the intervening column of air 337 enclosed by the tube 336 will be tuned to respond to the same frequency of vibrations as the natural frequency of vibration of the diaphragm 110. In the operation of this form of the invention compressional submarine waves having the same frequency as the natural frequency of vibration of the diaphragm 110 are transmitted through the exterior wall 330 of the vessel and act to set up corresponding vibrations in the column of air 337 and consequently in the secondary diaphragm 110. The vibration of the diaphragm 110 sets up corresponding electrical oscillations in the circuit 133, 134, as hereinbefore described.

In Fig. 19 is shown a modified form of this invention in which a receiving device constructed in accordance with this invention is arranged in a rudder 340 of a marine vessel 341. This form of the invention includes an electrical oscillator 105 which is enclosed in an opening provided therefor in the rudder 340 and which is arranged to set up electrical oscillations in the circuit 133, 134 which may be arranged to control any suitable receiving device or system, as will appear hereinafter. The oscillator 105 is constructed as hereinbefore described and includes a secondary diaphragm 110 which is arranged to be actuated as a result of the vibration of two parallel, oppositely disposed, spaced main diaphragms 343, which are marginally secured to the rudder 340 over a circular opening provided therefor through the rudder and which are tuned to the same natural frequency of vibration as the natural frequency of vibration of the secondary diaphragm 110. A column 344 of air is enclosed in the rudder between the secondary diaphragm 110 and the main diaphragms 343 and is so proportioned as to respond to the vibrations of the main diaphragms 343 when these are submerged and vibrating in their natural frequency. It is obvious that all of the various features of the receiving systems hereinbefore described and shown in Figs. 9 to 13 inclusive might be embodied in the form of this invention shown in Fig. 19.

For receiving and utilizing the electrical oscillations produced as hereinbefore described in the circuit 271, 271 or in any of the circuits 133—134, this invention provides an improved receiving system, one form of which is shown in Fig. 20. In the form shown this system comprises three detectors or amplifiers 400, 401 and 402, which for clearness of description may be referred to hereinafter as the first, second, and third amplifiers respectively. These amplifiers may be of any suitable construction and in the form shown are of a well known construction, each comprising a vacuized glass bulb 405 containing a filament or heater 406, a grid 407, and a plate 408. The three filaments 406 are arranged to be heated by a common battery 410. The positive pole of the battery 410 is connected through a switch 411, main positive conductor 412 and branch conductors 413 to one end of each filament, and the negative pole of the battery 410 is connected through a ballast 414, main negative conductor 415, branch conductors 416, and rheostats 417 with the other end of each filament 406.

The ballast 414 may be of any suitable construction and in the form shown includes an iron wire 419 arranged in a container 420 filled with hydrogen gas, and the ballast 414 is of such capacity that having once adjusted the rheostats 412 with the switch 411 closed, to cause the filament to be heated to a suitable temperature, the ballast 414 will compensate for any fluctuations in the voltage of the battery 410. Having once made this adjustment, the switch 411 may then be opened to avoid waste of current when it is not desired to operate the system, and the system may afterwards be quickly rendered operative merely by closing the switch 411, whereupon within a few seconds the filaments will be brought to their steady, predetermined working temperature. The three amplifiers are arranged to be controlled by a circuit 430 which may be for instance any one of the hereinbefore described circuits 133—134, or the hereinbefore described circuit 271—271, and which includes a main inductance 431 and an auxiliary inductance 432. The main inductance 431 forms the primary of a step-up transformer 433 having a secondary 434 which is in a closed oscillatory circuit 435 including a variable condenser 436, and which is tuned to the predetermined frequency of the electrical oscillations on the circuit 430. This closed circuit 435 is arranged to control the first amplifier 400, one side of the variable condenser 436 being connected to the grid 407 of the amplifier through a stoppage condenser 437 and the other side of the variable condenser 436 being connected to the corresponding filament 406 through an extension of the main positive conductor 412 of the battery 410. The first amplifier 400 controls a circuit including a battery 440, an inductance 441, and a portion of the main positive conductor 412. This inductance 441 forms the primary of an autotransformer having a secondary inductance 442 which is in a closed oscillatory circuit 443 including a variable condenser 444. This circuit is tuned to the predetermined frequency of the oscillations set up by the electrical oscillator in the circuit 430, and is arranged to act through a stoppage condenser 445 to control the second amplifier 401.

The second amplifier 401 controls a circuit including a battery 450, and an inductance 451 which forms the primary of an autotransformer which has a secondary inductance 452 which is in a closed oscillatory circuit 453 which includes a variable condenser 454. This closed circuit is tuned to the same predetermined frequency as the other closed oscillatory circuits 435 and 443 and is arranged to act through a stoppage condenser 455 to control the third amplifier 402.

The third amplifier 402 controls a circuit including a battery 460, a direct current micro-ammeter 461, a relay 462, a telephone receiver 463, and an extension of the main positive conductor 312 of the heating battery 310.

For increasing the sensibility of the system, a shunt circuit 470 extends around the telephone receiver 463 from a point between the relay 462 and the receiver to the main positive conductor 412 of the battery 410. This shunt circuit includes a variable condenser 471 and an inductance 472 which is adjustably coupled to the hereinbefore described auxiliary inductance 432 and forms the secondary of an adjustable coupling transformer 473 of which the auxiliary coil inductance 432 forms the primary. It has been found in practice that this shunt circuit 470 increases by many times the sensibility of the system.

Now with a proper coupling of the electrical oscillator 105 and the transformers 433 and 473 so that all the currents will aid each other, and with a proper tuning of all the closed oscillatory circuits, the system shown in Fig. 20 will "sing" or oscillate at the predetermined frequency. By then decreasing the coupling of the transformer 473 by increasing the distance between the coils 432 and 472 until the system will oscillate only while oscillations of the predetermined frequency are being generated by the oscillator 105 in the circuit 430, 431, 432, the system will be adjusted to its maximum sensibility and no further adjustment will be necessary.

In Figs. 21 and 22 the full lines 475 and 476 indicate approximately the resonance curves of the system shown in Fig. 20 when operating under different conditions. The frequency of the received compressional waves is plotted along the line of abscissas 477 and the amplitude or amount of useful direct current which is delivered through the ammeter 361 is plotted along the line of ordinates 478. The dotted line 479 indicates approximately the amount of current necessary to operate the relay 462. In Fig. 21 the resonance curve 475 indicates approximately the operation of the system when the vibrating elements are not all tuned to the same frequency and in Fig. 22 the resonance curve 476 indicates approximately the operation of the system when the vibrating elements are all tuned to the same frequency. The depressed portions of the curve 475 of Fig. 21 may be very narrow, for instance only the width resulting from a few cycles difference in the frequency of the received compressional waves. A comparison of the two resonance curves 475 and 476 makes it evident that in the operation of the system sharpness of tuning, or selectivity, sensitiveness, and efficiency are all greatly increased by having the various elements of the system tuned to respond to the same frequency.

In Fig. 23 is shown a system constructed in accordance with this invention whereby a primary trailer may be normally towed by a vessel and a secondary trailer may be held in reserve and automatically substituted for the primary trailer in case the primary trailer should become injured to such an extent as to short-circuit or break the circuit extending through the cable by which the primary trailer is being towed. In the form shown this system comprises a marine vessel or other movable body 500 provided with a primary trailer 501 and a secondary trailer 502. These two trailers are constructed in any suitable manner, for instance as hereinbefore described and shown in Figs. 1 to 10 except that the primary trailer 501 contains as an additional feature a battery 503 the function of which will be described hereinafter. These trailers are arranged to be towed respectively and successively by two cables 505 and 506, the outer ends of which are connected as hereinbefore described to the front ends of the two trailers respectively and the inner ends of which are secured in fixed positions by clamps 530 and 531 to the vessel 500. Extending through the two cables 505 and 506 respectively are two circuits 536, 537 and 538, 539, each of which corresponds to the hereinbefore described circuit 133, 134 of the trailer 49 shown in Fig. 1, and each of which is arranged as hereinbefore described to have set up therein electrical oscillations of a predetermined frequency as a result of the action of compressional submarine waves of the same frequency acting upon the corresponding trailer 501 or 502. The added battery 503 of the primary trailer 501 is arranged in the circuit 536, 537 controlled by the primary trailer. This circuit also contains an electromagnet 545 shunted around which is a variable condenser 546. The circuits 536, 537, and 538, 539 terminate in two pairs of fixed terminal contacts 550, 551 and 552, 553 respectively.

Mounted upon the boat 500 is any suitable system for receiving and amplifying the electrical oscillations, for instance a receiving system constructed as hereinbefore described and shown in Fig. 20 may be used for this purpose. The initial circuit 430, 431, 432 of the system is arranged to connect two fixed terminals 555 and 556, and a switch 557 is arranged to connect the two terminals 555 and 556 either with the two terminal contacts 550 and 551 of the circuit controlled by the primary trailer 501, or with the two terminal contacts 552 and 553 of the circuit controlled by the secondary trailer 502.

The primary trailer 501 is normally positioned in the water and is normally towed by the boat 500 while the secondary trailer 502 is normally held in reserve upon a support 559 which is rigidly secured to the boat 500 and which has a hollow semi-cylindrical upper surface the longitudinal axis of which is inclined rearwardly and downwardly at an angle sufficiently steep to cause the secondary trailer 502 to slide downwardly into the water when released. The secondary trailer is normally held in a given position upon the support 559 by means of a bolt 560 which passes slidably through three eyes, 561, 562 and 563, two of which, 561 and 563, are fixed upon the boat 500 and the third of which, 562, is arranged between and in alinement with the other two and is fixed upon the secondary trailer 502. When the secondary trailer is in this position its cable 506 is arranged in a coil upon the boat 500.

For automatically severing the towing cable 505 of the primary trailer 501 at a point near its inner end, and for simultaneously releasing the secondary trailer 502 and rendering it operative as a result of a short circuit or a break in the circuit 536, 537 controlled by the primary trailer 501, a hollow cylinder 570 is fixed upon the boat 500 and is provided with a piston rod 571 extending slidably therethrough and projecting in opposite directions therefrom. One end of this rod is rigidly secured to the outer end of the bolt 560, and rigidly secured to the other end of this rod is a knife 572 having a sharp edge normally spaced outwardly from and facing the towing cable 505 of the primary trailer 501 and arranged to be moved inwardly with the rod 571 in such a path as to sever the cable 505. A piston 575 is arranged to reciprocate in the cylinder 570 and is fixedly secured to the piston rod 571. This piston is normally held in its innermost position as shown in Fig. 23 by means of a compressed spiral spring 576 arranged in the cylinder 570. The outward movement of the piston 575 is limited by means of a collar 577 adjustably secured to the piston rod 571. The switch 557 comprises two conducting arms 580 and 581 and a crossbar 582 of insulating material which is terminally connected pivotally to the two arms. The two arms 580 and 581 are arranged to swing respectively about the two fixed terminals 555 and 556 and to be swung from the operative position shown in full lines in Fig. 23 to the other operative position shown in dotted lines in Fig. 23 by means of a lever 583 which is pivotally connected to the crossbar 582 and the inner end of which is provided with an elongated slot 584 the walls of which slidably surround a fixed pivot 585. The outer end of the lever 583 is pivotally connected to one end of a connecting rod 586 the other end of which is pivotally connected to the outer end of a lug 587 which is rigidly secured to the piston rod 571.

For controlling the piston 575, a tank 590 or other source of compressed air is provided and arranged to communicate with the inner end of the cylinder 570 through a pipe 591 controlled by a normally closed piston valve 592 or other suitable valve controlled by a fixed electromagnet 593. The electromagnet 593 is in a normally open circuit including a battery 595, a fixed terminal 596, and a pivoted armature 597 which is arranged to swing into and out of engagement with the fixed contact 596 and to be normally held out of engagement therewith against the action of a spiral spring 598 by means of the electromagnet 545.

In the operation of the receiving system shown in Fig. 23, the compressional submarine waves are normally received by the primary trailer 501, and the secondary trailer 502 is normally held in reserve upon the support 559 as shown, but if for any reason the circuit 546, 547 controlled by the primary trailer 501 should become broken or short-circuited, the battery 527 would cease to energize the electromagnet 545 and consequently the armature 597 would be permitted to close the circuit through the electromagnet 593 thus opening the valve 592 and permitting the compressed air from the tank 590 to force the piston 575 outwardly to the limit of its stroke. This movement of the piston 575 would cause the piston rod to move the knife 572, the bolt 560 and the lever 583 and thus substantially simultaneously sever the cable 505 of the primary trailer 501, release the secondary trailer 502 and permit it to fall into the water, and operatively connect the secondary trailer 502 through the switch 557 to the receiving circuits controlled thereby and including the hereinbefore described telephone receiver 463 and relay 462.

For the purpose of testing the condition of either trailer 501 or 502 and the circuits controlled thereby from the boat 500 without operating a distant submarine transmitter, the boat 500 may be provided with any suitable means for generating submarine compressional waves having a frequency the same as that to which the trailers are tuned to respond, and having an amplitude about the same as would be the amplitude at the trailers of compressional submarine oscillations when received from a distant station when the boat 500 is at approximately the maximum distance it is desired to have it proceed from the station. For instance the boat 500 may be provided, as shown in Fig. 23, with any one of the hereinbefore described sound receivers arranged to be operated as a sound transmitter, the transmitter 105—306 shown in Fig. 23 for this purpose being the same in construction and arrangement as the hereinbefore described receiver shown in Fig. 14, except that instead of having its circuit 133, 134 arranged to be energized as a result of the vibration of the primary diaphragm 306, this circuit is arranged to have electrical oscillations of the desired frequency set up therein as a result of the action of an electrical oscillator or vibrator of any well known or suitable construction. In the form shown in Fig. 23 this circuit 133, 134 is arranged to be energized by means of an electrical oscillator 600 of well known construction comprising a tuning fork 601, a telephone transmitter button or microphone 602, and an electromagnet 603. The tuning fork 601 is so selected that the natural frequency of the vibration of its prongs is exactly the same as the frequency to which the trailers 501 and 502 are tuned, and the microphone 262 is rigidly secured to the shank of the tuning fork in such a manner that as the tuning fork vibrates, the resistance of the microphone will be periodically varied accordingly. The electromagnet 603 is fixed between the prongs of the tuning fork and is in a circuit which includes a battery 604 and the microphone 602. The circuit 133, 134 is shunted around the microphone and forms a derived circuit in which is inserted a condenser 605 and a variable impedance 606.

In the operation of the transmission system shown in Fig. 23, the tuning fork 601 having been once set into vibration by striking one of its prongs will be caused to continue to vibrate in its natural frequency by the action of the battery 604 acting through the microphone 602, and the impedance 606 having been properly adjusted, continuous electrical oscillations having the same frequency as the natural frequency of vibration of the tuning fork and having a constant amplitude of suitable magnitude will be set up in the circuit 133, 134, and as a result of these oscillations the primary diaphragm 306 will be caused to transmit submarine compressional waves of the desired frequency and amplitude. These submarine waves may be used to test the condition of the trailers 501, 502 and thus avoid any necessity of submarine waves transmitted from a distant station for this purpose.

From the foregoing it is evident that this invention provides a receiving system for compressional waves which comprises a plurality of vibratory elements arranged to respond in succession to the action of compressional waves and conjointly operative to set up electrical oscillations successively in a plurality of electrically coupled circuits wherein the oscillations are amplified and act ultimately to control a plurality of receiving devices.

For every vibrating system of one element there is one frequency of vibration to which it will respond more readily than to any other unless the system is heavily damped. If the system contains more than one element which may vibrate there will be in general as many different periods of free vibrations as there are elements unless the elements have the same natural frequency of vibration or are so connected together as to be compelled to vibrate in unison. The less closely or rigidly the elements are coupled or connected together the easier it is for any one element to assert its own characteristic. This is true in mechanics and electricity as well as in sound, one of the most common examples being found in electrical transformers, where with magnetism as the connecting link between two coils of wire, the connection is made closer as the magnetic reluctance is made less, either by bringing the coils closer to each other or by inserting an iron core between the coils, or by doing both. In any case the more nearly all of the vibrating elements are tuned to respond to the same frequency, the more sensitive the system will be to respond to the frequency to which it is tuned, and the less likely the system will be to respond to any other frequency.

The system provided by this invention includes as hereinbefore described, one or more primary diaphragms arranged to receive compressional submarine waves and to act through a resonator or confined column of air to set up vibrations in a secondary diaphragm which is arranged to actuate a generator of electrical oscillations. The diaphragms and the enclosed column of air are so proportioned and arranged as to have the same natural frequency of vibration when in their operative positions. It is not sufficient to tune each of these elements by itself and then assemble the elements, as when the elements are assembled each element reacts upon the others, and allowance must be made for this as determined by experimental trial under actual working conditions. After the proper proportions of each part and a suitable arrangement of the parts have been thus determined experimentally it is comparatively easy to duplicate the results.

The temperature compensating device 170-196 shown in Figs. 9 and 11 might be applied to keep organ pipes in tune to the same standard pitch under widely varying temperature ranges. In Fig. 24 the device 170-196 is shown applied to a vertical organ pipe 700 of well known construction provided with the usual lip 701 and having an open upper end and having a tapered lower end provided with an inlet 702 for compressed air. The spindle 172 is placed across the upper open end of the pipe to locate the valve 176 at the crest of the sound wave formed in the pipe. The construction of the compensator in Fig. 24 is the same as that shown in Figs. 9 and 11 and the operation is the same.

Only a few of the many forms in which this invention may be embodied have been described herein, and it is to be understood that the invention is not limited to any specific construction but might be applied in various forms without departing from the spirit of the invention or the scope of the appended claims.

Having thus fully described my invention, what I claim is:

1. A receiver for compressional waves comprising a plurality of vibratory elements, means for actuating a utility, said means being controlled by the conjoint action of said elements, two of said elements being diaphragms, and one of said elements being an elastic medium interposed between said diaphragms and automatic means responsive to variations in temperature to vary the size of said elastic medium.

2. A receiver for compressional waves, comprising a plurality of vibratory elements, means for actuating a utility, said means being controlled by the conjoint action of said elements, two of said elements being diaphragms and one of said elements being an enclosed elastic medium interposed between said diaphragms, and automatic means responsive to variations in temperature to vary the size of said elastic medium.

3. A receiver for compressional waves comprising a vibratory element normally tuned to respond at a given temperature to compressional waves having a given frequency, and means automatically operative to cause said element to respond to waves of the said frequency under changes in the temperature of said element.

4. A receiver for compressional waves including an enclosed elastic fluid tuned to respond at a given temperature of said fluid to compressional waves of a given frequency, and means automatically operative to cause said fluid to respond to compressional waves of the same frequency under variations in the temperature of said fluid.

5. A receiver for compressional waves including an enclosed body of air forming a resonator tuned to respond at a given temperature of said air to compressional waves of a given frequency, and means automatically operative to cause said body of air to respond to compressional waves of the same frequency under variations in the temperature of said air.

6. The combination with means providing a resonator tuned to respond to compressional waves of a given frequency at a given temperature of said resonator, and means automatically operative to maintain a constant tuning of said resonator under variations in the temperature thereof.

7. A receiver for compressional waves, comprising a hollow member, a vibratory element arranged to produce compressional waves in said hollow member, a second hollow member spaced from said first member, yielding means connecting said members, a vibratory element carried by said second member and arranged to respond to compressional waves produced therein, and yielding sound insulating material supporting said second member.

8. A receiver for compressional waves, comprising a hollow member, a diaphragm arranged to produce compressional waves in said hollow member, a second hollow member communicating with and spaced from said first-mentioned member, yielding sound absorbing means connecting said members, and a diaphragm carried by said second member and arranged to respond to compressional waves produced therein as the result of the action of said first-mentioned diaphragm.

9. A receiver for compressional waves comprising a plurality of vibratory elements, means for actuating a utility, said means being controlled by the conjoint action of said elements, two of said elements being diaphragms and one of said elements being an elastic medium interposed between said diaphragms, and means automatically operable for varying the action of said elastic medium.

10. A receiver for compressional waves comprising a plurality of vibratory elements, means for actuating a utility, said means being controlled by the conjoint action of said elements, two of said elements being diaphragms and one of said elements being an elastic medium interposed between said diaphragms, and means controlled by variations in temperature for varying the action of said elastic medium.

11. A receiving system for compressional waves, comprising a plurality of elements, means for actuating a utility, said means being controlled by the conjoint action of said elements, two of said elements being arranged to have said waves impinged thereon and one of said elements being an elastic medium interposed between said first-named elements, and automatic means to modify the action of said elastic medium.

Signed at Fortress Monroe in the county of Elizabeth City and State of Virginia, this 10th day of June, A. D. 1918.

HERBERT GROVE DORSEY.